Figure 1:
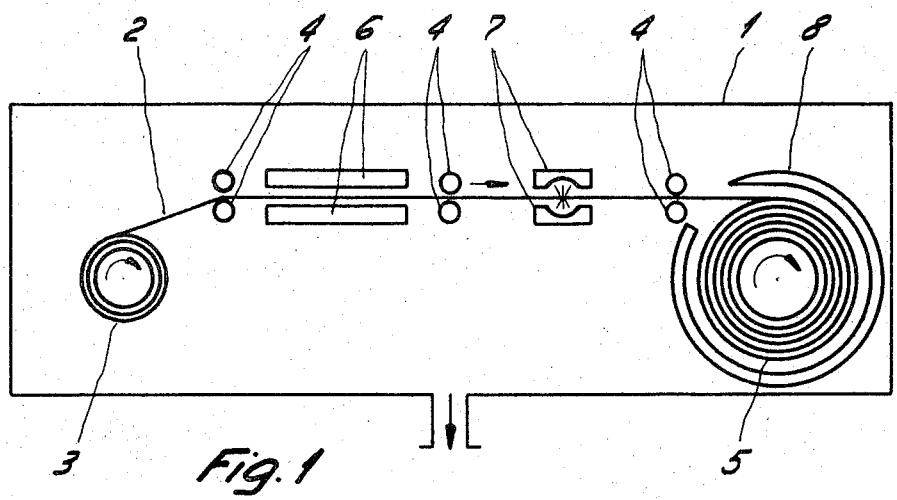

United States Patent [19]
Roth et al.

[11] 3,845,543
[45] Nov. 5, 1974

[54] METHOD OF PRODUCING A VACUUM SWITCH CONTACT

[75] Inventors: Adrian W. Roth, Aarau; Joachim Amsler, Seon, both of Switzerland

[73] Assignee: Sprecher & Schuh AG, Aarau, Switzerland

[22] Filed: Feb. 22, 1973

[21] Appl. No.: 334,889

[30] Foreign Application Priority Data
Mar. 17, 1972  Switzerland.......................... 4036/72

[52] U.S. Cl.................... 29/472.3, 29/494, 29/502, 29/622, 29/630 C, 113/119
[51] Int. Cl............................................ B23k 31/02
[58] Field of Search....... 29/472.3, 494, 502, 630 C; 200/166 C, 166 CM; 113/119; 26/622

[56] References Cited
UNITED STATES PATENTS

| | | | |
|---|---|---|---|
| 2,234,834 | 3/1941 | Scott............................. | 200/166 C |
| 3,125,654 | 3/1964 | Arnold........................... | 200/166 C |
| 3,497,944 | 3/1970 | Antle............................. | 29/494 |
| 3,566,463 | 3/1971 | Kobayashi et al........... | 200/166 C X |
| 3,590,467 | 7/1971 | Chase et al.................. | 29/502 X |
| 3,770,497 | 11/1973 | Hassler et al................ | 29/630 C |

FOREIGN PATENTS OR APPLICATIONS

| | | | |
|---|---|---|---|
| 1,808,810 | 6/1970 | Germany...................... | 200/166 C |

*Primary Examiner*—Andrew R. Juhasz
*Assistant Examiner*—Ronald J. Shore
*Attorney, Agent, or Firm*—Waters, Roditi, Schwartz & Nissen

[57] ABSTRACT

A method of producing a vacuum switch contact in which a support material in the form of thin sheet metal having a low vapor pressure is placed in a vacuum chamber and heated to a temperature above 600°C to degas it. The support material is then vapor coated in vacuo with a material having a high vapor pressure. The sheet metal is formed into thin layers which are pressed together and heated to a temperature above the melting point of the high vapor pressure material until diffusion of the two materials and soldering of the compressed layers of sheet metal take place, whereupon the contact is cooled and removed from the vacuum tank.

3 Claims, 4 Drawing Figures

METHOD OF PRODUCING A VACUUM SWITCH CONTACT

The invention relates to a method of producing a vacuum switch contact with a support material having a low vapor pressure and a material which is vapor-coated in vacuo on the support material and which has a high vapor pressure, the contact being heated in vacuo to a given temperature until the two materials are alloyed by diffusion.

Switch contacts for vacuum switches must have a high mechanical strength and be so made as not to weld together in the make position. High mechanical strength materials, for example, iron, copper, tungsten, molybdenum, tantalum, have a very low vapor pressure and high arc voltage, and this results in break-down of the arc for interruption before the current passes through zero. Low vapor pressure materials also tend to weld when used as contact material. To prevent welding of the contacts made from a low vapor pressure material, the contact surfaces are alloyed with a high vapor pressure material, and this results in some brittleness of the contact surfaces. The high vapor pressure material having the low arc voltage prevents breakdown of the arc for interruption before the current passes through zero.

A vacuum switch is known wherein the contact members consist of a high arc voltage material and in which the contact surface is provided with recesses into which is fitted a material having a low arc voltage. The contact members are heated in vacuo to a given temperature until alloying of the two materials takes place by diffusion, whereupon excess high arc voltage material adjoining the alloy is removed from the contact surface. The low arc voltage material can be applied to the high arc voltage material before diffusion by electroplating or vapor deposition.

Complete degassing of the high mechanical strength support material is very important in vacuum switches. Contacts which have not been completely degassed throughout their mass may, in the event of intensive heating or cracking in the contact member, give off gas and, on a pressure rise, cause the malfunctioning of the vacuum switch.

The known contacts are very expensive to manufacture because the high mechanical strength material is first degassed in vacuo, for example by the zone melting process, then machined, and then alloyed at least at the contact surface, with the high vapor pressure material in another stage of the process.

An object of the invention is to provide a method for the economically advantageous production of a vacuum switch contact.

According to the present invention there is provided a method of producing a vacuum switch contact with a support material having a low vapor pressure and a material which is vapor-coated in vacuo on the support material and which has a high vapor pressure, the contact being heated in vacuo to a given temperature until the two materials are alloyed by the method being characterised in that the support material is made from thin sheet metal and is taken through a production line in a vacuum tank in order to form it into a solid contact consisting of a plurality of layers, the support material first being provisionally heated to a temperature above 600°C. in the production line in order to degas it, and then in the next stage of the method is vapor-coated in known manner with the high vapor pressure material, and in the next stage of the process the thin layers of sheet-metal are pressed together and heated to a temperature above the melting point of the high vapor pressure material until diffusion of the two materials and soldering of the compressed layers of sheet metal take place, whereupon the contact is cooled and removed from the vacuum tank.

The thin sheet-metal is wound into a reel in the form of strip and is introduced in such form into the vacuum tank, where it is continuously unwound, degassed, coated and re-wound for performing the other stages of the method.

Tests have shown that support material made from sheet-metal of thicknesses between 0.05 and 0.5 mm can be degassed in an economically advantageous way at a temperature of somewhat above 600°C and a vacuum of above $10^{-3}$ Torr. Sheets thicker than 0.5 mm require an uneconomically long period for degassing. The method according to the invention enables the support material to be degassed with avoidance of the liquid phase.

Following is a description by way of example only with reference to the accompanying drawings of one method of carrying the invention into effect.

In the drawings:

FIG. 1 diagrammatically illustrates a strip production line.

Figures 2, 4:
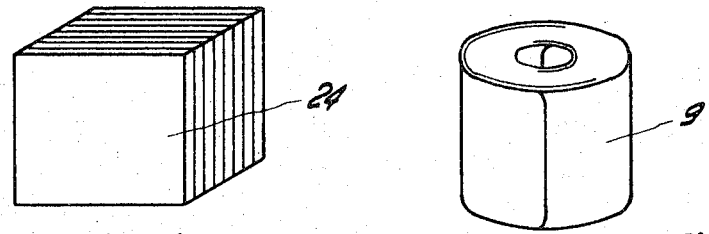

FIG. 2 shows a contact made by coiling.

Figure 3:
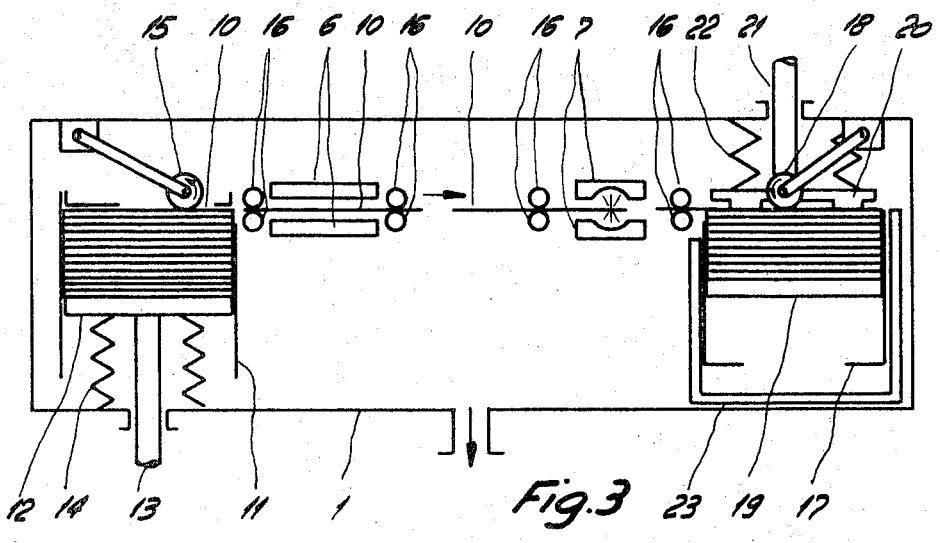

FIG. 3 diagrammatically illustrates a plate production line.

FIG. 4 shows a contact made from plates.

The production line shown in FIG. 1 is accommodated in a vacuum tank 1 connected to a vacuum pump. The support material consists of a thin metal strip 2 which is introduced into the vacuum tank 1 in the form of a reel 3. The lid (not shown) of the vacuum tank 1 is removable for this purpose and is disposed parallel to the plane of the drawing. The support material has a high mechanical strength, a low vapor pressure and high arc voltage, and preferably consists of iron, copper, tungsten, molybdenum or tantalum. The metal strip 2 is pulled between the guide rollers 4 in the vacuum tank 1 and is secured to the roller 5. The vacuum tank 1 is then closed so as to be vacuum-tight and is evacuated to a vacuum of at least $10^{-3}$ torr. The strip 2 is then transferred from the reel 3 to the reel 5. The strip 2 first passes through the continuous furnace 6, where it is provisionally heated to a temperature above 600°C. The strip 2 has a thickness of between 0.05 mm, and 0.5 mm. Such metal strip can be very satisfactorily degassed in a vacuum of at least $10^{-3}$ Torr and at temperatures of above 600°C. The thus degassed strip 2 then passes through the vapor tunnel 7, where it is vapor-coated, in known manner, with a material having a high vapor pressure and a low arc voltage. Material having a high vapor pressure is preferably bismuth, tin, lead or beryllium. The strip 2 is then wound onto the reel 5, so that the layers of the strip are pressed tightly in contact. When the entire strip 2 has been wound on the reel 5, the heating system 8 is switched on. The entire reel 5 is heated above the melting point of the material having the high vapor pressure and is kept at this temperature until diffusion of the two materials and soldering of the layers of strip occurs. The heating system 8 is then switched off and the strip 5 is cooled.

After removal of the lid, the solid contact member 9 (FIG. 2) can be removed from the vacuum tank 1.

FIG. 3 shows another variant of the production process in which thin sheets are introduced in the form of stacked plates 10 into the vacuum tank 1. The plates are placed in a magazine 11. The plates 10 are pushed forward in the magazine 11 by means of a plate 12 actuated from the exterior. An actuating rod 13 for the plate 12 is surrounded by bellows 14 so as to be vacuum-tight. A roller 15 bearing resiliently on the plates 10 can be rotated from outside by means of an electric drive, so that the top plate 10 in the magazine 11 is pushed between the rotating guide rollers 16. The plates 10 are guided at both sides. They pass through the continuous furnace 6 and the vapor tunnel 7 and are stacked in the magazine 17 at the end. The roller 18 bears resiliently on the plates 10 and can be rotated from outside by an electrical drive, to push the plates 10 into the magazine 17. The guide plate 19 in the magazine 17 has a relatively considerable frictional resistance. When all the plates 10 have been introduced into the magazine 17, the stack of plates is pressed together from outside by means of the pressure plate 20. Actuating rods 21 for the plate 20 are surrounded by bellows 22 so as to be vacuum-tight. A heater 23 is disposed around the magazine 17. The pressure plate 20 is also provided with heater elements. The pressed stack of plates in the magazine 17 is heated to a temperature above the melting point of the material having the high vapor pressure until diffusion of both materials and soldering of the compressed plates is effected. The heating 23 is then switched off, the stack is cooled and the vacuum tank 1 is opened.

The finished contact member 24 as shown in FIG. 4 can then be removed from the vacuum tank 1.

We claim:

1. A method of producing a vacuum switch contact constituted by a support material having a low vapor pressure and a further material having a high vapor pressure deposited on the support material by evaporation in vacuo, said method comprising placing a supply of the support material in sheet form having a thickness of 0.05 to 0.5 mm in a vacuum chamber at a vacuum pressure of at least $10^{-3}$ Torr, heating successive sections of said supply of support material in said chamber to a temperature above 600°C to degas the material, subsequently vapor-coating in said chamber said successive sections of the support material with said further material of high vapor pressure, reforming in said chamber the now coated support material into its original supply form, subjecting the supply of coated support material in said vacuum chamber to a compressive force at a temperature above the melting point of said further material to effect diffusion of the two materials and joinder thereof, and then cooling and removing the now formed contact from the vacuum chamber.

2. A method as claimed in claim 1 wherein the supply of support material is in the form of thin sheet metal wound in the form of a reel, the heating of successive sections of said material to degas the same being effected by continously unwinding the sheet metal and passing it through a furnace disposed in said vacuum chamber, the reforming of the coated material being effected by rewinding the coated material in the form of a reel.

3. A method as claimed in claim 1 wherein the supply of support material is in the form of thin sheets stacked on one another, the sheets being individually degassed and coated and then reformed by being re-stacked.

* * * * *